Figure 1:
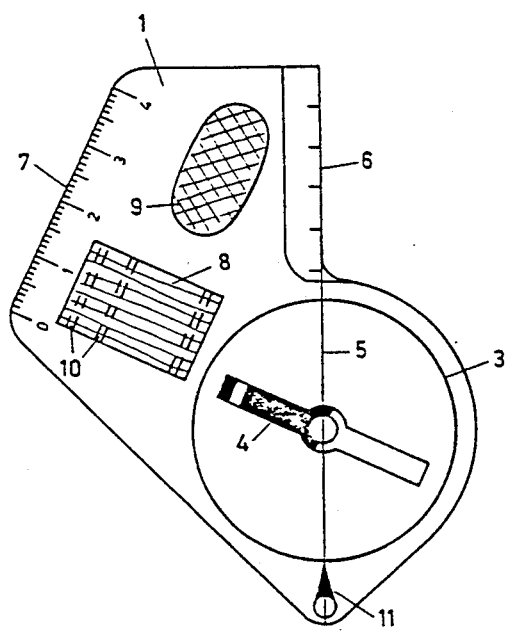

United States Patent [19]

Norman et al.

[11] Patent Number: 4,462,164
[45] Date of Patent: Jul. 31, 1984

[54] ORIENTEERING COMPASS

[76] Inventors: Erik B. Norman, Rusbogatan 12, 77600 Hedemora; Sven A. Yngström, Svartkällevägen 3, 70375 Örebro, both of Sweden

[21] Appl. No.: 420,227
[22] PCT Filed: Jan. 11, 1982
[86] PCT No.: PCT/SE82/00005
 § 371 Date: Sep. 3, 1982
 § 102(e) Date: Sep. 3, 1982
[87] PCT Pub. No.: WO82/02429
 PCT Pub. Date: Jul. 22, 1982

[30] Foreign Application Priority Data

Jan. 12, 1981 [SE] Sweden .................. 8100133

[51] Int. Cl.³ .......................................... G01C 17/02
[52] U.S. Cl. .................................. 33/355 R; 33/342
[58] Field of Search ............... 33/342, 347, 349, 352, 33/355, 356, 364

[56] References Cited

U.S. PATENT DOCUMENTS

| 57,970 | 9/1866 | Reid | 33/342 |
| 3,373,429 | 3/1968 | Anderson | 33/356 |
| 4,404,752 | 9/1983 | Hanna | 33/347 |

FOREIGN PATENT DOCUMENTS

| 25787 | 6/1952 | Finland | 33/355 |
| 2480975 | 10/1981 | France | 33/355 |
| 94489 | 2/1939 | Sweden | 33/349 |
| 96751 | 9/1939 | Sweden | 33/349 |
| 99350 | 7/1940 | Sweden | 33/349 |
| 117137 | 9/1946 | Sweden | 33/364 |
| 119370 | 7/1947 | Sweden | 33/355 |
| 119598 | 9/1947 | Sweden | 33/355 |
| 128254 | 5/1950 | Sweden | 33/364 |
| 491364 | 11/1970 | Switzerland . | |
| 445312 | 4/1936 | United Kingdom | 33/364 |

Primary Examiner—Richard R. Stearns

[57] ABSTRACT

An orienteering compass comprises a compass housing (3) with a movable north indicator (4) and a base plate (1) having a fixed course line (5). To enable directions to be extracted and checked in a simple fashion, and to enable a map to be read more positively when orienteering, the compass housing (3) is non-rotatably connected to the base plate (1) and the base plate together with the compass housing is arranged so that it can be pressed against and readily held on a map with the course line (5) in the desired direction. Preferably, the course line (5) extends in front of the compass housing (3) and coincides with a longitudinally extending edge (6) of the base plate (1).

8 Claims, 6 Drawing Figures

ORIENTEERING COMPASS

The present invention relates to an orienteering compass comprising a compass housing with a moveable north indicator and a base plate having a fixed course line.

In order to enable a user of a compass to move in a given direction, the compass direction, conventional orienteering compasses of the aforedescribed kind are equipped with a moveable compass housing. For the purpose of extracting a compass direction, the compass is placed on a map or chart in a manner such that the course line coincides or extends parallel to the direction from a starting point to a target or goal. The compass housing is then rotated so that lines marked on the compass housing coincide with or extend parallel to meridians on the map. In this respect it must be ensured that the north marking on the compass housing is directed towards north on the map. The compass is then removed from the map and rotated so that the north indicator coincides with the north marking on the compass housing. The correct compass direction is indicated by the course line on the base plate, when the compass is held in this position.

The aforedescribed method is relatively complicated and involves a number of error risks. Since the compass is normally read when completely separated from the map, a error in compass-house setting can take a long time to discover. Thus, the original setting is not checked before it becomes obvious that an error has been made, which may be much too late. Further, it is difficult to teach the aforedescribed orienteering method so that a beginner can readily understand the coordination between compass and map. This is particularly true with respect to the transfer of a direction on a map to a corresponding compass direction. Simultaneous reading of the compass and map is made difficult by the fact that the compass and map are held in different hands, which constitutes a further error risk.

The main object of the present invention is to provide an orienteering compass in which the aforementioned disadvantages are eliminated. To this end the compass according to the invention is so constructed that it must always be used in connection with a map, said compass being characterized in that the compass housing is joined to the base plate in a non-rotatable fashion; and in that the base plate with the compass housing is so arranged that it can be pressed against and readily secured to a map with the course line in the desired direction.

According to the invention, the compass and map must be rotated as a unit in order to obtain the desired direction, and when aligning the map image in question is, at the same time, seen in a correctly orientated position. Thus, with each check of the direction there is also automatically obtained information concerning the map image or picture in question, or conversely each time the map image or picture is looked at it is possible, at the same time, by glancing at the north indicator of the compass, to check that the map is held correctly, i.e. orientated in the north-south direction, since it is only in this direction that the map image or picture agrees with reality.

In accordance with a preferred embodiment of the compass according to the invention, the compass housing is arranged with the centre of rotation of the north indicator located on the extended course line, which in the vicinity of the compass can have the form of a line drawn on the bottom of the compass housing or on the base plate. Further, that part of the course line which extends in front of the compass housing preferably coincides with a longitudinally extending edge of the base plate. This edge is suitably chamfered and provided with a distance scale.

To facilitate pressing of the compass against a map, the compass is suitably provided with a thumb-grip comprising an adjustable stirrup-like structure intended for the thumb, said structure preferably having the form of an elastic band preferably a rubber band, arranged on one side of the compass housing. For the purpose of increasing the friction betewen the thumb and the base plate and between the plate and the map, an area on both sides of the base plate is suitably provided with a friction-increasing material. To facilitate use of the compass by persons with impaired sight, the compass may be provided with a detachable magnifying glass covering the area immediately adjacent the edge of the base plate coinciding with the course line.

In accordance with a further variant of the compass according to the invention, which variant is particularly suitable when the compass is used in search operations and military operations, the north indicator has the form of a rotatable disc graduated in degrees, lines or the like.

Figure 2:
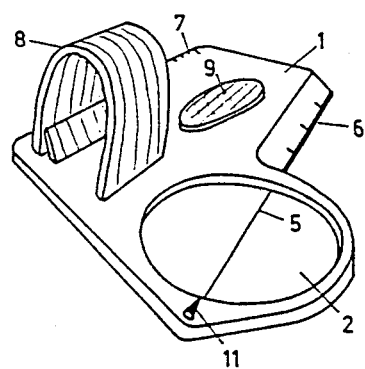
Figure 3:
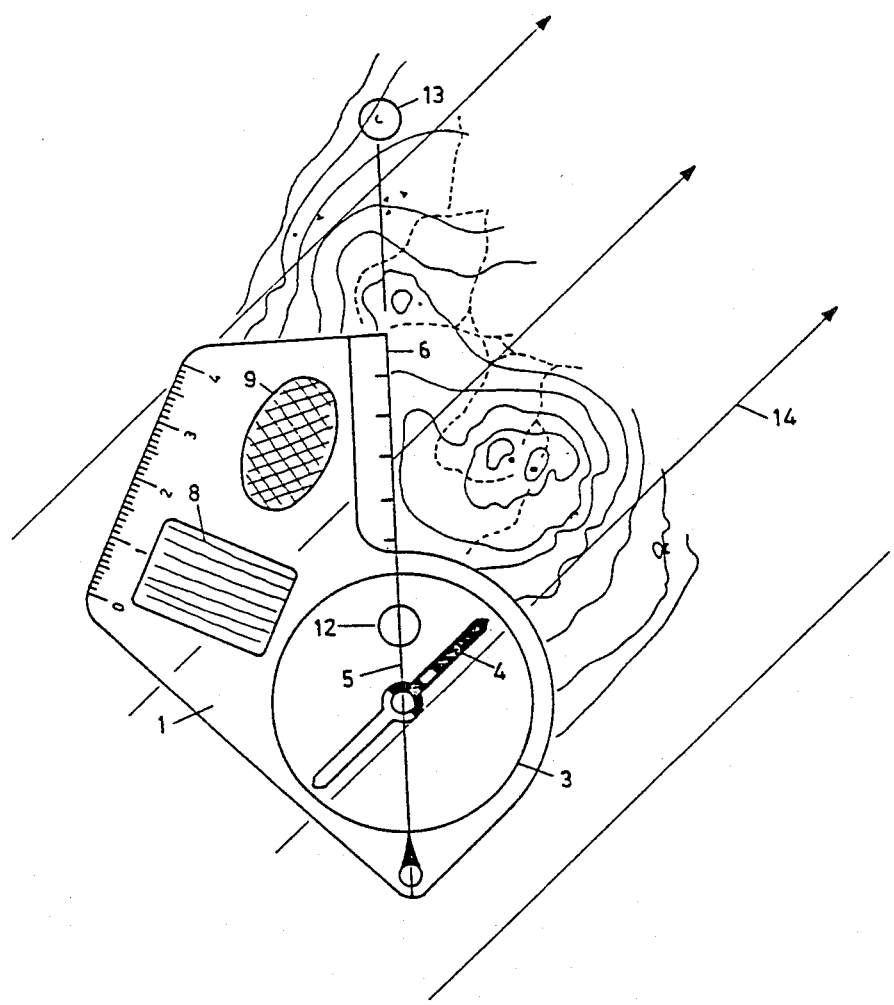
Figure 4:
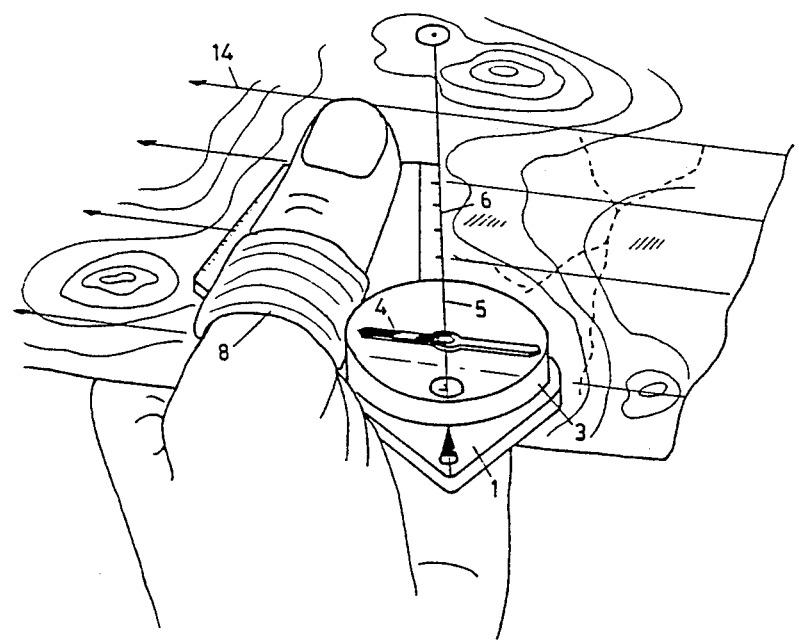
Figure 5:
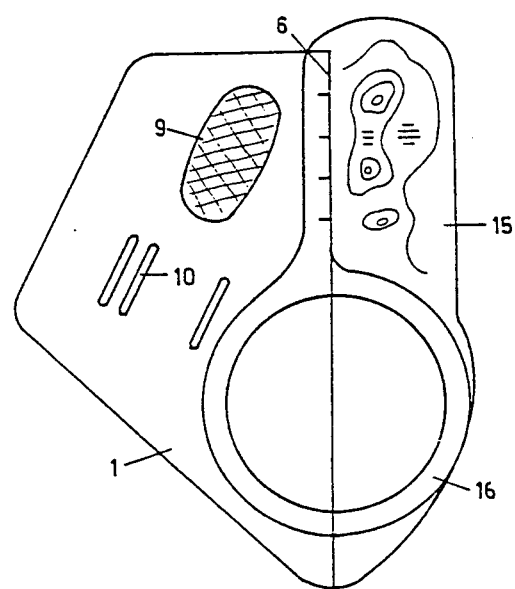
Figure 6:
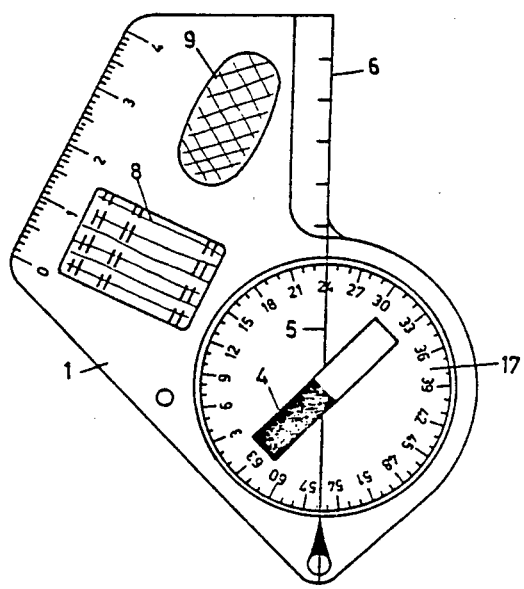

The invention will now be described in more detail with reference to the accompanying drawings, in which FIG. 1 is a horizontal view of an orienteering compass according to the invention, FIG. 2 is a perspective view of the base plate, FIG. 3 illustrates how a course is extracted on a map or chart, FIG. 4 illustrates how the compass and chart are held while being used, FIG. 5 illustrates the base plate with a magnifying glass mounted thereon, and FIG. 6 illustrates an alternative embodiment of the orienteering compass according to the invention.

As will be seen from FIGS. 1 and 2 the orienteering compass according to the invention comprises a base plate 1 having a recess 2 for receiving a compass housing 3. The compass housing 3 is non-rotatably mounted in the recess 2, and may, alternatively, form an integral part of the base plate 1. Mounted for free rotation in the compass housing is a magnetic north indicator, which in the illustrated embodiment has the form of a rotatable needle 4. The compass housing 3 is of known design, and is suitable filled with a damping liquid and fully transparent. Extending in the bottom of the recess 2 is a course line 5, which coincides with a forward longitudinal edge 6 of the base plate 1. The edge 6 is chamfered to avoid the occurrence of disturbing reflections when reading the map, and is provided with distance scale adapted to a suitable map scale. The reference 7 identifies a graduated straightedge, which can be used when measuring distances on maps having a different scale.

To enable the compass to be pressed and held against a map, the base plate is provided, on the side of the compass housing 3, with a thumb grip which includes an adjustable stirrup-like structure 8, and an area of friction-increasing material 9. An area of friction-increasing material corresponding to the area 9 is also suitably arranged on the opposite surface of the plate, to increase the friction against an underlying map. The stirrup-like structure 8 suitably includes an elastic band, such as a rubber band, which passes through longitudinally extending slots 10, thereby enabling the stirrup to be readily adjusted. The slots 10 are parallel with the longitudinal direction of the thumb and are directed obliquely to the edge 6 of the plate 1. The reference 11 identifies a direction arrow.

The illustrated embodiment of the base plate 1 with an oblique rear edge and with the course line 5 coinciding with the edge 6 of the plate, and the illustrated position of the thumb grip 8 and the compass housing 3 enable the compass to be readily and effectively pressed against and held to the map with one hand, and also enables the map to be orientated and read quickly and positively. The portion 5 of the course line extending beneath the compass housing can be excluded to eliminate any confusion with the meridians on the map.

FIG. 3 illustrates how the compass is used together with the map for obtaining a correct direction between a starting point 12 and a goal 13. In this case, the compass is placed on the map so that the course line 5 coincides with or is parallel to a straight line between the starting point and said goal. In the example illustrated in FIG. 3, the compass has been placed so that the atarting point 12 is located beneath the compass housing 3. However, the compass may also be positioned, for example, so that the starting point 12 is located at a desired location on the distance scale on the edge 6 of the base plate 1. The compass is then fixed in the taken position, by pressing the compass against the map with the thumb.

In order to obtain a correct direction to the goal, the map need then only be aligned in the north-south direction, which must be done in all orienteering cases, since it is only in this position that the map picture coincides with reality. This alignment of the map is effected by simply rotating compass and map as a unit until the north indicator 4 is parallel with the meridians 14 on the map. When this has been done, the correct direction to follow is straight forwards, i.e. in the direction shown by the course line 5.

Each time a map is studied, the map is thus orientated with the aid of the north indicator, whereat the correct direction is automatically obtained at the same time. Since the compass and map are held fixed relative to one another with only one hand, there is no risk of errors of the kind which readily occur when using conventional compasses, where the compass is held in one hand and the map in the other. This latter method makes it difficult to precisely orientate the map when reading the same. Further, in the case of a conventional compass an information of the map image in question is not automatically obtained when checking the compass course, as opposed to the case when checking the compass course with the compass according to the invention, in which the map is read adjacent the course line. As the person using the compass moves along the line extending between the starting point 12 and the goal 13, the compass, if so desired, can also be moved along said line, so that the map can be constantly read together with the distance scale. This is an advantage since in orienteering, the distance is continuously checked by counting the number of steps taken.

FIG. 4 illustrates how the map and compass are held firmly while checking both direction and the map image or picture. This can also be done while running, which is not possible when using conventional compasses, since compass and map are held in different hands.

Thus, the most important advantages afforded by an orienteering compass according to the invention are that the compass affords rapid, positive and simple orienteering, which can also be readily learned and taught. As before mentioned, it is extremely simple, among other things, to extract the direction in which it is desired to move, since it is only necessary to place the compass in the desired direction on the map and then to align the map with the compass fixed thereon, whereafter the correct direction is straight forwards in the direction shown by the course arrow, which direction will thus coincide with the direction on the map. There is hardly any chance of an error being made. Changes in direction can be readily made, since it is only necessary to rotate the compass on the map and then to reorientate the map, the course arrow then pointing in the new, correct direction. As also mentioned in the aforegoing, the map can be read positively and quickly, since the map is always read in a correctly orientated position and adjacent the course line. The base plate 1 is, in this respect, suitably so formed that the thumb extends to the position at which the map is read.

When the map is read over a relatively small area adajcent the chamfered edge 6, the compass may be readily provided with a magnifying glass 15, as illustrated schematically in FIG. 5. In this emmbodiment, the magnifying glass 15 is provided with an annular holder 16 which fits around the compass housing 3. The holder 16 is suitably so formed that the magnifying glass 15 can only be fitted over and removed from the compass housing 3 in a given position of rotation, which differs from the position illustrated in the Figure, this latter position being used when reading the map.

FIG. 6 illustrates an alternative embodiment of a compass according to the invention which is particularly suited for use by search parties and in military operations, where a number of people must move in a given direction. In the compass according to the FIG. 6 embodiment, the north indicator is provided with a rotatable disc 17 graduated in degrees or lines. In this case, the leader need only extract a course on a map and inform the persons taking part in the search or the military operation as to the number of degrees or lines which correspond to the desired direction. The members of the search party or military operation need then only turn so that the course line of the compass corresponds to the number on the disc 17, and move in the correct direction, which is straight forwards, i.e. in the direction of the extension of the course line. A corresponding design may also be used for navigation on board a ship. In this respect, the base plate is given a greater length and is suitably provided with suction cups on the bottom thereof, to enable the compass to be fixed to a map-reading table. The aforementioned thumb grip is not required in this case.

The compass according to the invention may also be varied in other respects within the scope of the claims, among other things with respect to the geometric shape of the base plate and the holder means thereon, and also with respect to the positioning and form of the course line. A common feature of all embodiments is that they include a base plate and a compass housing non-rotatably connected thereto, whereat the correct direction is determined while holding the compass in direct contact with a map, chart or the like. Thus, the setting of the north indicator is read directly against the meridians of the map and not against markings on the compass housing.

We claim:

1. An orienteering compass comprising an integral base plate defining a course line, a non-rotatable compass housing on said base plate having a movable north indicator and a transparent base, a stirrup-like holder mounted on said base plate for receiving a thumb inserted therein, such that said base plate and said compass housing can be pressed against and readily secured to a map, said compass housing being arranged with the center of rotation of the north indicator located on the extended course line, a portion of the base plate extending in front of the compass housing, and said stirrup-like holder being arranged on said base plate, such that when pressing said base plate against a map, the thumb passes on the side of the compass housing and makes contact with the portion of the base plate extending in front of the compass housing at a position adjacent the course line.

2. A compass according to claim 1, wherein the course line extending in front of the compass housing coincides with a longitudinal edge of the base plate.

3. A compass according to claim 2, wherein said longitudinal edge of the base plate is chamfered and provided with a distance scale.

4. A compass according to claim 2, further comprising a detachable magnifying glass mounted immediately adjacent the edge of the base plate coinciding with the course line for covering an area of the map immediately adjacent said course line.

5. A compass according to claim 1, wherein said stirrup-like holder comprises an adjustable stirrup mounted on the base plate to the side of the compass housing.

6. A compass according to claim 5, wherein said stirrup is formed of an elastic band.

7. A compass according to claim 1, wherein the plate is provided with a friction-increasing material in the region of said plate where the thumb is intended to press against; and at least one area of the opposite surface of the plate is provided with a friction-increasing material for increasing the friction against the map.

8. A compass according to claim 1, wherein said north indicator further comprises a rotatable disc graduated in degrees.

* * * * *